US012754975B2

(12) United States Patent
Miyata

(10) Patent No.: US 12,754,975 B2
(45) Date of Patent: Oct. 6, 2026

(54) IMAGE PROCESSING APPARATUS CAPABLE OF QUICKLY REACHING DESIRED OPERATION SCREEN, IMAGE PROCESSING SYSTEM, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Takaaki Miyata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 18/765,428

(22) Filed: Jul. 8, 2024

(65) Prior Publication Data

US 2025/0021625 A1 Jan. 16, 2025

(30) Foreign Application Priority Data

Jul. 11, 2023 (JP) ................................ 2023-113587

(51) Int. Cl.
*G06F 18/23213* (2023.01)
*H04N 1/00* (2006.01)

(52) U.S. Cl.
CPC ... *G06F 18/23213* (2023.01); *H04N 1/00413* (2013.01); *H04N 2201/0094* (2013.01); *H04N 2201/04* (2013.01)

(58) Field of Classification Search
None
See application file for complete search history.

(56) References Cited

U.S. PATENT DOCUMENTS

2020/0311414 A1* 10/2020 Enuka .................. G06F 16/353

FOREIGN PATENT DOCUMENTS

JP 2011015348 A 1/2011

* cited by examiner

*Primary Examiner* — Lennin R RodriguezGonzalez
(74) *Attorney, Agent, or Firm* — Venable LLP

(57) ABSTRACT

In an image processing apparatus, first scanned data is acquired by scanning a first document, and second scanned data is acquired by scanning a second document different from the first document. On a console section, a predetermined operation is executed on the first document. Each of users who operate the console section is identified. Clustering is performed for classifying the first scanned data into one of a plurality of clusters, set for each user, according to contents of the first document. An operation content executed on the first document for each user is associated with the cluster into which the first scanned data has been classified. One of the plurality of clusters, into which the second scanned data is to be classified, is inferred. An operation content associated with a cluster into which the second scanned data is inferred to be classified is displayed.

15 Claims, 15 Drawing Sheets

*FIG. 2A*

250

INVOICE

March 1, 2023
XYZ Co., Ltd.
100, Y-cho, X-city

To: ABC Co., Ltd.

Total amount ¥15,000-

| Description | Unit price | Quantity | Money amount |
|---|---|---|---|
| Ground use fee | ¥10,000 | 1 | ¥10,000 |
| Lighting facility use fee | ¥5,000 | 1 | ¥5,000 |
| | | | |
| | | | |
| | | Total | ¥15,000 |

Please transfer this amount to the following account by March 31, 2023:
Bank: Ajisai Bank, Budou Branch
Account type: Ordinary deposit
Account No.: 123456

FIG. 2B

252

March 1, 2023

To Administrator of the Himawari Stadium

Equipment Rental Application

Name: Taro Tokyo

I apply for rental of the following articles with the following condition.

1. Rental articles

| Article name | Quantity | Purpose |
|---|---|---|
| Pitching machine | 2 | To practice batting |
| Ball | 50 | Ditto |
| | | |
| | | |
| | | |

2. Rental period

From March 1, 2023 to March 3, 2023

(CONCLUDED)

IMAGE PROCESSING APPARATUS CAPABLE OF QUICKLY REACHING DESIRED OPERATION SCREEN, IMAGE PROCESSING SYSTEM, METHOD OF CONTROLLING IMAGE PROCESSING APPARATUS, AND STORAGE MEDIUM

BACKGROUND OF THE INVENTION

Field of the Invention

The present invention relates to an image processing apparatus that is capable of quickly reaching a desired operation screen, an image processing system, a method of controlling the image processing apparatus, and a storage medium.

Description of the Related Art

In accordance with multi-functionalization of an image forming apparatus in recent years, an operation menu displayed on a console section of the image forming apparatus also tends to have a wide variation range and become complicated. For example, in an image forming apparatus having a copy function, a scan function, and a fax transmission function, operations for executing these functions are performed on a console section of the image forming apparatus, and hence the number of operation menus to be displayed on the console section is necessarily increased. Further, in a case where each operation menu is selected on the console section, a sub menu is further displayed on the console section, and the sub menu is selected. Therefore, a user takes a lot of time to reach a menu for executing a desired function, or it becomes difficult to reach the corresponding menu. Japanese Laid-Open Patent Publication (Kokai) No. 2011-15348 discloses an image forming apparatus that determines a type of a document scanned to acquire image data and stores an associated operation menu (recommended function) on a document type-by-document type basis. In this image forming apparatus described in Japanese Laid-Open Patent Publication (Kokai) No. 2011-15348, when a document is scanned, in a case where this document is a document for which a recommended operation menu is stored, it is possible to display the recommended operation menu on the console section.

However, in the image forming apparatus described in Japanese Laid-Open Patent Publication (Kokai) No. 2011-15348, although it is possible to display the recommended operation menu on a document type-by-document type basis, in a case where there are a plurality of users who use the image forming apparatus, a recommended operation menu which a user desires to use can vary from one user to another. For example, in a case where the recommended operation menu for an invoice is a fax transmission menu, one user performs an operation for fax transmission to transmit data obtained by scanning an invoice, by fax. On the other hand, another user does not perform the operation for fax transmission but performs operation for email transmission to transmit data generated by scanning an invoice, by email. This brings about a problem that the other user is required to search for an operation screen for email transmission, and as a result, the other user cannot quickly reach the operation screen for email transmission.

SUMMARY OF THE INVENTION

The present invention provides a mechanism for making it possible to quickly reach an operation screen on which a desired operation can be performed.

In a first aspect of the present invention, there is provided an image processing apparatus including a scanner unit configured to be capable of acquiring, by scanning a first document, first scanned data of the first document and acquiring, by scanning a second document different from the first document, second scanned data of the second document, an operation unit configured to be capable of executing a predetermined operation on the first document scanned by the scanner unit, an identification unit configured to identify a plurality of users who operate the operation unit, on a user-by-user basis, a clustering unit configured to perform clustering for classifying the first scanned data into one cluster of a plurality of clusters set for each user, according to contents of the first document, an associating unit configured to associate an operation content executed by the operation unit on the first document for each user with the cluster into which the first scanned data has been classified, an inference unit configured to infer one cluster of the plurality of clusters, into which the second scanned data is to be classified, and a control unit configured to perform control to display an operation content associated with a cluster into which the second scanned data is inferred to be classified by the inference unit.

In a second aspect of the present invention, there is provided an image processing system that includes an image processing apparatus that is capable of performing image processing, and a server that is communicably connected to the image processing apparatus, and wherein the image processing apparatus includes a scanner unit configured to be capable of acquiring, by scanning a first document, first scanned data of the first document and acquiring, by scanning a second document different from the first document, second scanned data of the second document, an operation unit configured to be capable of executing a predetermined operation on the first document scanned by the scanner unit, and an identification unit configured to identify a plurality of users who operate the operation unit, on a user-by-user basis, and wherein the server includes a clustering unit configured to perform clustering for classifying the first scanned data into one cluster of a plurality of clusters set for each user, according to contents of the first document, an associating unit configured to associate an operation content executed by the operation unit on the first document for each user with the cluster into which the first scanned data has been classified, an inference unit configured to infer one cluster of the plurality of clusters, into which the second scanned data is to be classified, and a control unit configured to perform control to display an operation content associated with a cluster into which the second scanned data is inferred to be classified by the inference unit.

According to the present invention, it is possible to quickly reach an operation screen on which a desired operation can be performed.

Further features of the present invention will become apparent from the following description of exemplary embodiments (with reference to the attached drawings).

BRIEF DESCRIPTION OF THE DRAWINGS

FIGS. 2A to 2C are diagrams each showing an example of a document scanned by a scanner of the image forming apparatus.

DESCRIPTION OF THE EMBODIMENTS

The present invention will now be described in detail below with reference to the accompanying drawings showing embodiments thereof. However, the configuration described in the following embodiments is given only by way of example and is by no means intended to limit the scope of the present invention. For example, components of the configuration of the present invention can be replaced by desired components which can exhibit the same function. Further, a desired component can be added. Further, two or more desired configurations (features) of the embodiments can be combined.

Figure 1A:
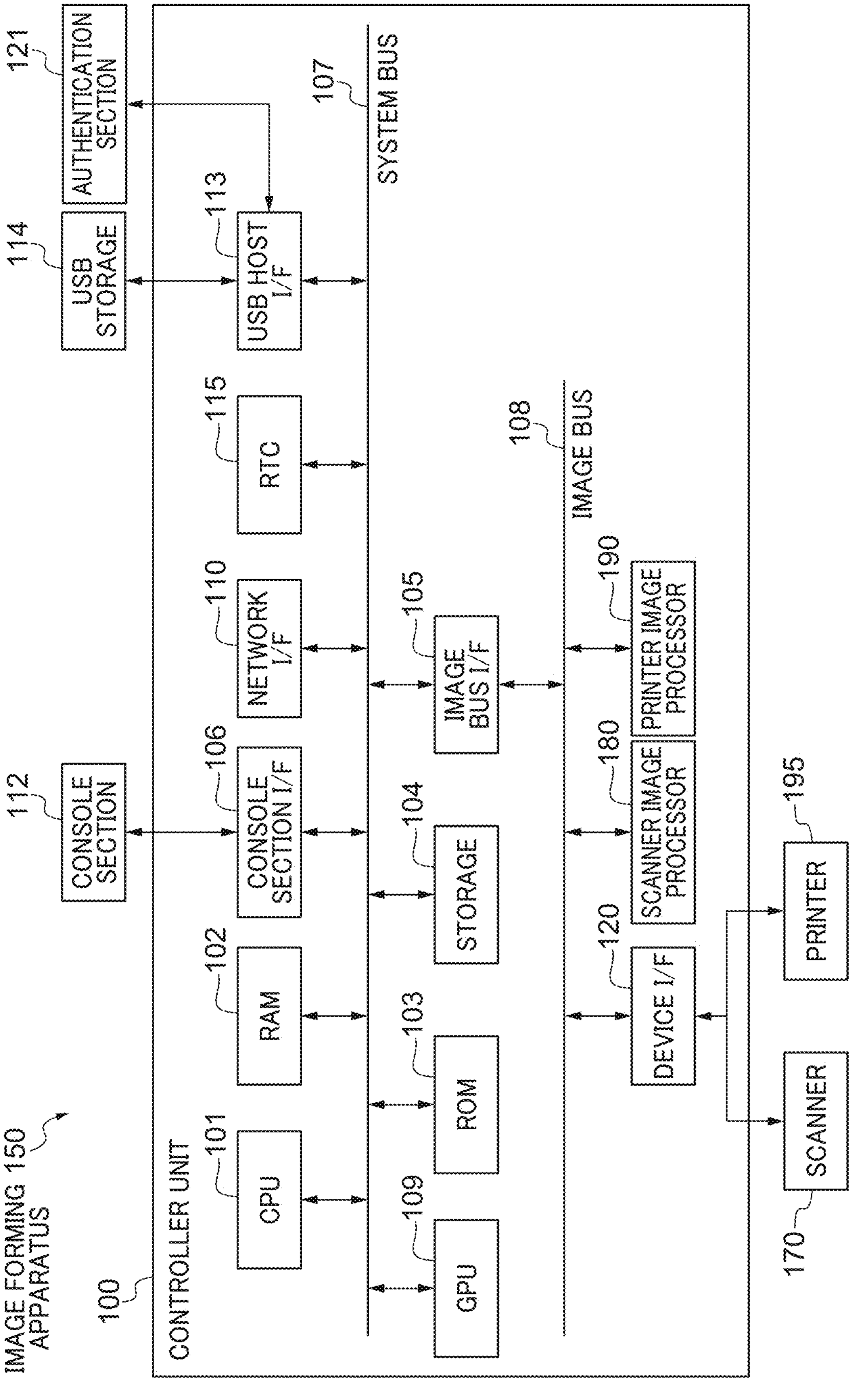
FIG. 1A is a block diagram showing a hardware configuration of an image forming apparatus according to a first embodiment.
Figure 1B:
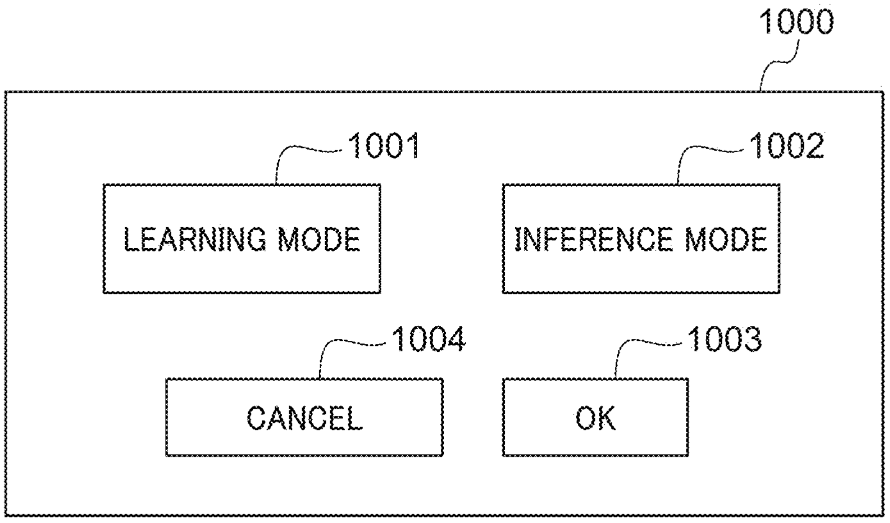
FIG. 1B is a diagram showing an example of a screen displayed on the image forming apparatus.

A first embodiment will be described below with reference to FIGS. 1A to 7. FIG. 1A is a block diagram showing a hardware configuration of an image forming apparatus according to a first embodiment. FIG. 1B is a diagram showing an example of a screen displayed on the image forming apparatus. The image forming apparatus shown in FIG. 1A, denoted by reference numeral 150, to which an image processing apparatus capable of performing image processing is applied, is a multifunction peripheral (MFP) having e.g. a copy function, a scan function, a fax transmission function, and an email transmission function. The image forming apparatus 150 includes a controller unit 100, a console section (operation unit) 112, a Universal Serial Bus (USB) storage 114, an authentication section (identification unit) 121, a scanner 170 as an image input device, and a printer 195 as an image output device. The controller unit 100 controls the printer 195 to print and output image data read by the scanner 170. The controller unit 100 includes a Central Processing Unit (CPU) (control unit) 101, a Random Access Memory (RAM) 102, a Read Only memory (ROM) 103, a storage 104, an image bus interface (I/F) 105, a console section I/F 106, a system bus 107, and a Graphics Processing Unit (GPU) 109. Further, the controller unit 100 includes an image bus 108, a network I/F 110, a USB host I/F 113, a Real Time Clock (RTC) 115, a device I/F 120, a scanner image processor 180, and a printer image processor 190. In the controller unit 100, the CPU 101 to the console section I/F 106, the GPU 109, the network I/F 110, the USB host I/F 113, and the RTC 115 are connected via the system bus 107 in a state communicable with each other. Further, the image bus I/F 105, the device I/F 120, the scanner image processor 180, and the printer image processor 190 are connected via the image bus 108 in a state communicable with each other.

The CPU 101 starts up an operation system (OS) according to a boot program stored in the ROM 103. The CPU 101 executes a variety of processing operations, i.e. controls the operations of the components by executing programs stored in the storage 104 on this OS. The ROM 103 stores settings for performing a variety of configurations of the image forming apparatus 150. In these settings, as described hereinafter, an inference flag indicating whether the image forming apparatus 150 operates in a learning mode or an inference mode is included. Note that in the image forming apparatus 150, a switching image 1000 (see FIG. 1B) for switching the mode between the learning mode and the inference mode is displayed on the console section 112. The switching image 1000 includes a learning mode button 1001, an inference mode button 1002, an OK button 1003, and a cancel button 1004. The learning mode button 1001 is operated, i.e. pressed when operating the image forming apparatus 150 in the learning mode. This disables the inference flag. Then, when the OK button 1003 is operated after the learning button 1001 is operated, the image forming apparatus 150 operates in the learning mode. The inference mode button 1002 is operated when operating the image forming apparatus 150 in the inference mode. This enables the inference flag. Then, when the OK button 1003 is operated after the inference button 1002 is operated, the image forming apparatus 150 operates in the inference mode. The cancel button 1004 is operated when canceling the operation of the learning mode button 1001 or the inference button 1002. Thus, the image forming apparatus 150 has a learning function and an inference function. The GPU 109 is a computing unit capable of performing processing specialized to neural network computation. Note that the GPU 109 can also perform the computation processing in combination with the CPU 101. The GPU 109 functions as a clustering unit 302, a document recommended menu-setting unit 304, and an inference unit 500, which are described hereinafter, alone or in cooperation with the CPU 101. Further, the image forming apparatus 150 can have, for example, a Tensor Processing Unit (TPU) in place of the GPU 109. Further, the image forming apparatus 150 can have a Neural Processing Unit (NPU), and the NPU can perform the computation processing in cooperation with the CPU 101.

The RAM 102 is used as work areas for the CPU 101 and the GPU 109. Further, the RAM 102 is also used as an image memory area for temporarily storing image data. The storage 104 stores programs, image data, information about sheet feed capacity of the image forming apparatus 150 including the maximum number of sheets to be fed, and so forth. Note that these programs include, for example, a program for causing the CPU 101 (computer) to execute a method of controlling the components and the units of the image forming apparatus 150 (method of controlling the image processing apparatus). The console section I/F 106 is an interface with the console section 112 having a touch panel. The console section I/F 106 outputs image data to be displayed on the console section 112 to the console section 112. Further, the console section I/F 106 sends information input by a user via the console section 112 to the CPU 101. The network I/F 110 is an interface for connecting the image forming apparatus 150 to a Local Area Network (LAN). The USB host I/F 113 is an interface capable of communicating with the USB storage 114. The USB host I/F 113 is an output section for causing data stored in the storage 104 to be stored in the USB storage 114. Further, the USB host I/F 113 inputs data stored in the USB storage 114 to the CPU 101. The USB storage 114 is an external storage device storing data and can be attached and removed to and from the USB host I/F 113.

Further, the authentication section 121 is connected to the USB host I/F 113. The image forming apparatus 150 is used by a plurality of users, i.e. shared by the plurality of users. The authentication section 121 can identify the plurality of users who use the image forming apparatus 150, i.e. operate the console section 112, on a user-by-user basis. As the authentication section 121, in the present embodiment, for example, a card reader can be used. In this case, by holding an authentication card A owned by e.g. a user A over the card reader, operations performed on the image forming apparatus 150 thereafter are regarded as performed by the user A. Further, after that, by holding an authentication card B owned by e.g. a user B over the card reader, operations performed on the image forming apparatus 150 thereafter are regarded as performed not by the user A, but by the user B. Thus, in the present embodiment, the image forming apparatus 150 has the learning function and the inference function and is shared by a plurality of users. On the other hand, in contrast thereto, a smartphone, for example, has the learning function and the inference function but is not shared by a plurality of users i.e. is dedicated to one user. Note that in the present embodiment, as the authentication section 121, the card reader is used but is not limited to this, and for example, a device that performs biometric authentication based on a fingerprint, a vein or the like can be used. Further, to the USB host I/F 113, it is possible to connect not only the USB storage 114 and the authentication section 121, but also a plurality of USB devices. The RTC 115 controls time within the image forming apparatus 150. The time information controlled by the RTC 115 is used, for example, for acquiring a time when automatic shutdown is executed and for recording a job input time.

The image bus I/F 105 is a bus bridge for connecting between the system bus 107 and the image bus 108 that transfers image data at high speed and for converting the data format. The image bus 108 conforms to the standard of the Peripheral Component Interconnect (PCI) bus, Institute of Electrical and Electronics Engineers (IEEE) 1394, or the like. To the image bus 108, the device I/F 120, the scanner image processor 180, and the printer image processor 190 are connected. To the device I/F 120, the scanner 170 and the printer 195 are connected. The device I/F 120 performs synchronous/asynchronous conversion of image data. The scanner 170 is a document scanner unit (scanner unit) 300 for scanning a document to acquire scanned data of the document. The scanned data is used by the clustering unit 302 and the inference unit 500, described hereinafter. The printer 195 prints image data on a print sheet or the like and outputs the printed sheet. The scanner image processor 180 performs correction, processing, and editing on the scanned data. The printer image processor 190 performs correction, resolution conversion, and so forth, which are adapted to the printer 195, on image data for printing.

Figure 2C:
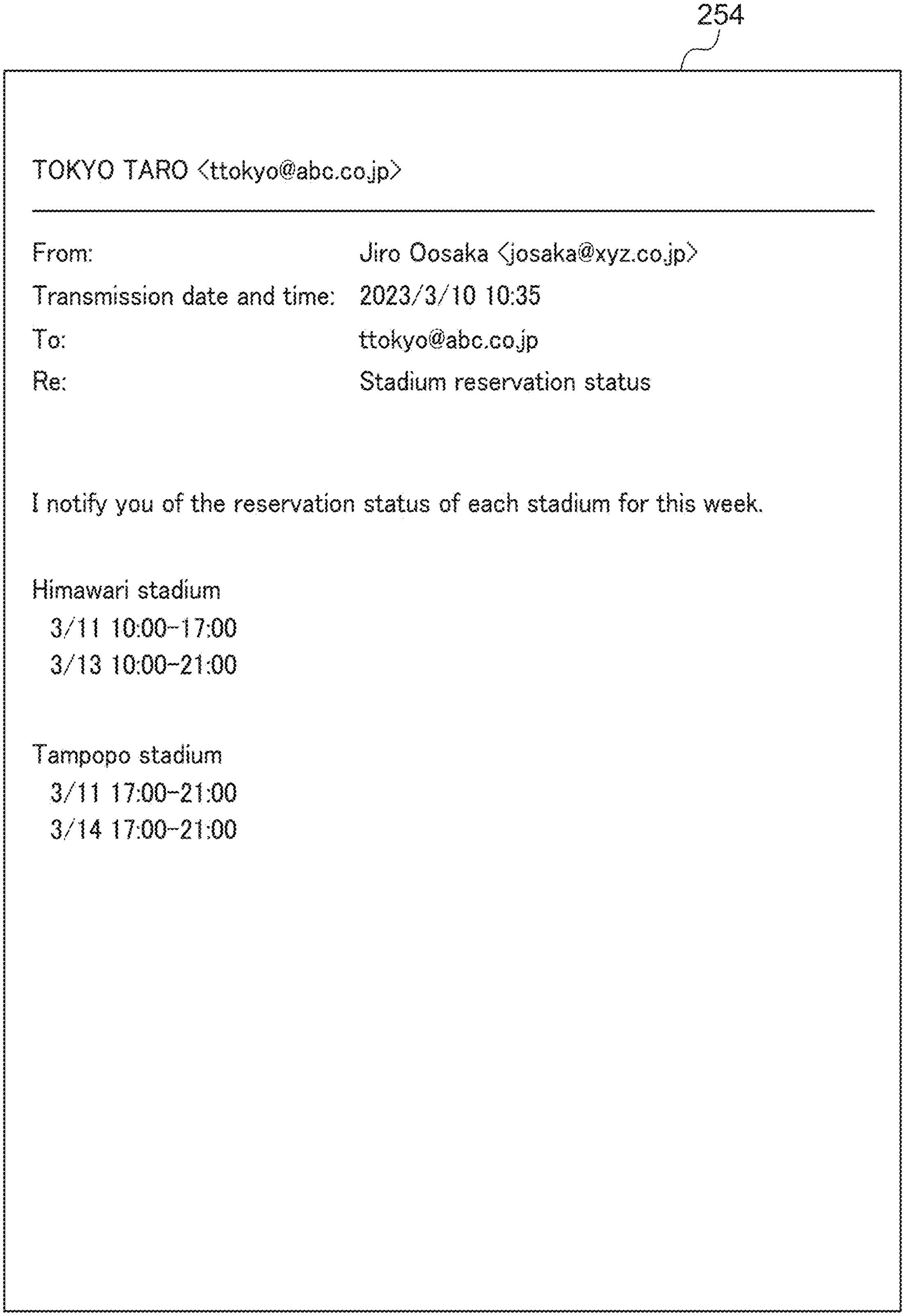

FIGS. 2A to 2C are diagrams each showing an example of a document scanned by the scanner of the image forming apparatus. A document 250 shown in FIG. 2A is an invoice for requesting payment of a use fee. A document 252 shown in FIG. 2B is an equipment rental application form for making an application for rental of equipment. A document 254 shown in FIG. 2C is a print on which the contents of an E-mail have been printed. The scanner 170 can scan each of the document 250, the document 252, and the document 254, set as a first document. With this, first scanned data of each first document is acquired. The clustering unit 302 can perform clustering for classifying the first scanned data of the first document into one cluster of a plurality of clusters set on a user-by-user basis, according to the contents of each first document. For example, a total of four clusters of a first cluster 311, a second cluster 312, a third cluster 313, and a fourth cluster 314 are set for the user A. In a case where the first scanned data is acquired using the scanner 170 by the user A operating the image forming apparatus 150, the acquired first scanned data is classified into one cluster of the first cluster 311 to the fourth cluster 314 by the clustering unit 302. Further, when performing clustering, the clustering unit 302 extracts a feature value from the first scanned data. Then, clustering is performed based on the feature value. As the feature value, for example, the following two features are used in the present embodiment, but this is not limitative: The first feature is a semantic vector which is generated by using a natural language processing model based on character information read using a reading unit, such as an Optical Character Recognition (OCR). The second feature is extraction and vectorization of image information (such as ruled lines and illustration) except characters, as a feature point.

Figure 3A:
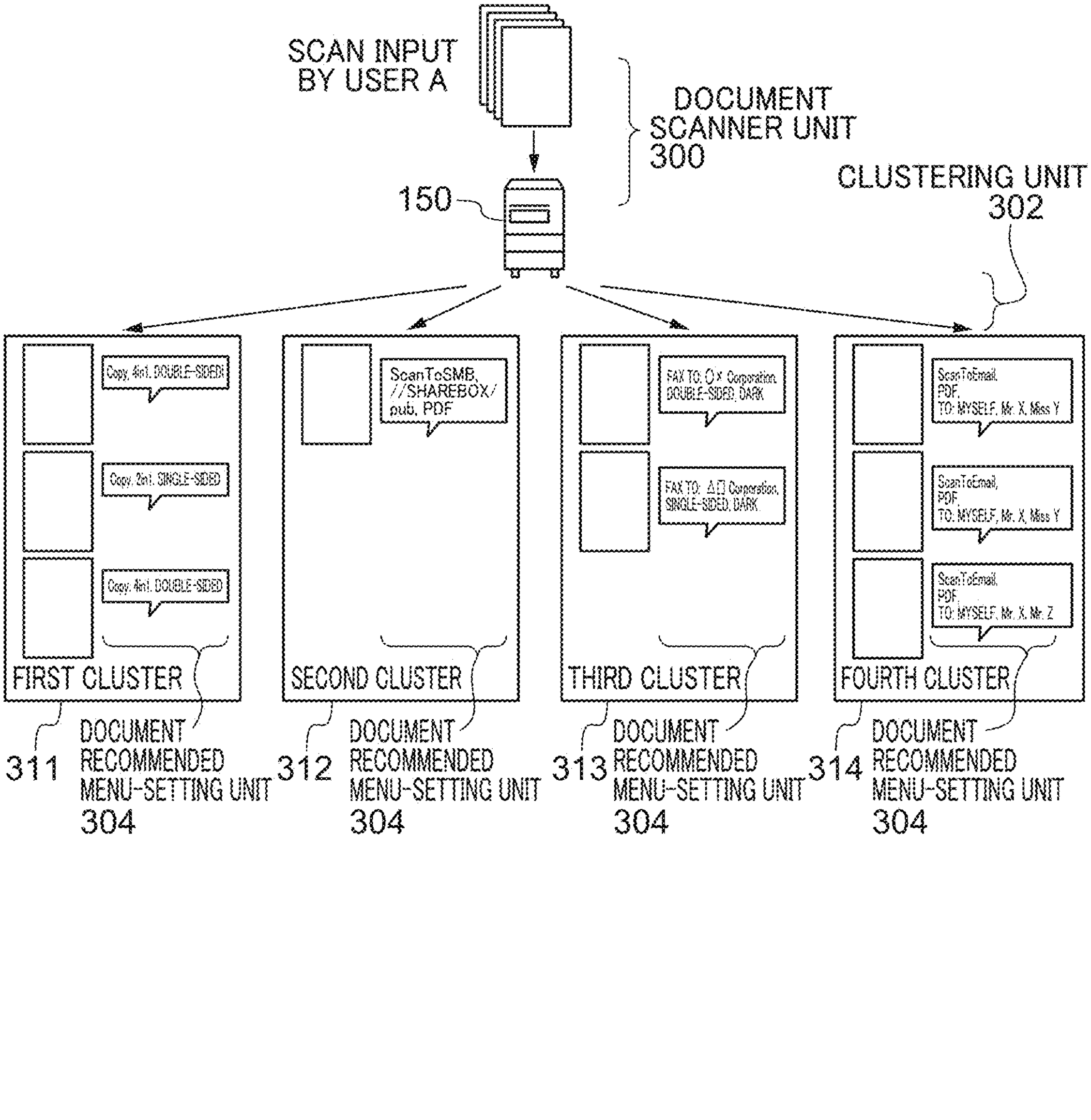
FIGS. 3A and 3B are diagrams useful in explaining a document scanner unit, a clustering unit, and a document recommended menu-setting unit (associating unit).
Figure 3B:
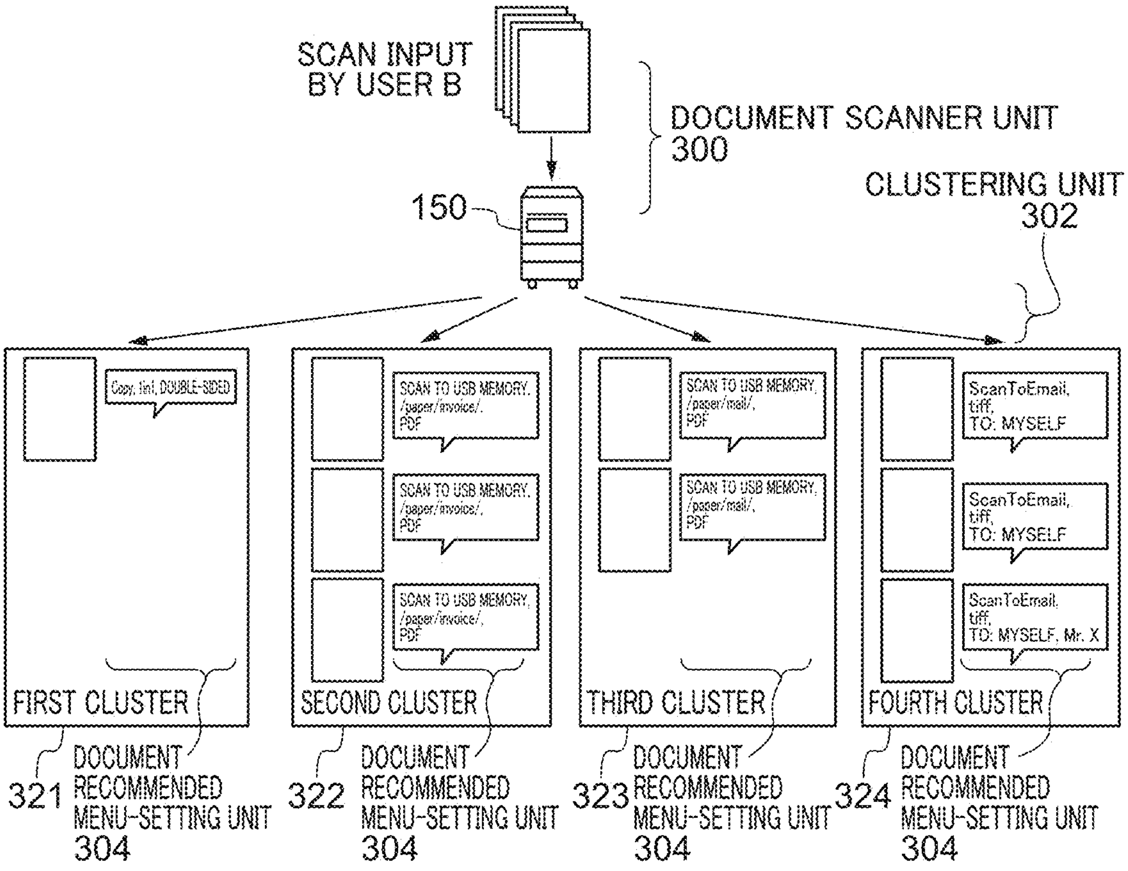

FIGS. 3A and 3B are diagrams useful in explaining the document scanner unit, the clustering unit, and the document recommended menu-setting unit (associating unit). FIG. 3A shows the operations of the document scanner unit 300, the clustering unit 302, and the document recommended menu-setting unit 304, which are performed when the user A operates the image forming apparatus 150 in the learning mode (learning phase) to scan a first document (scan input by the user A). FIG. 3B shows the operations of the document scanner unit 300, the clustering unit 302, and the document recommended menu-setting unit 304, which are performed when the user B operates the image forming apparatus 150 in the learning mode to scan a first document (scan input by the user B). Further, which of the user A and the user B has scanned the first document is identified based on who holds the authentication card over the authentication section 121 before scanning the first document.

Referring to FIG. 3A, first, when the user A operates the image forming apparatus 150, the first document is scanned by the document scanner unit 300. With this, the first scanned data of the first document is acquired. Then, as described above, the clustering unit 302 performs clustering for classifying the first scanned data into one cluster of four clusters set for the user A based on the feature values according to the contents of the first document. Note that although the number of clusters set for the user A is four in the present embodiment, this is not limitative, but for example, the number of clusters can be set to e.g. one to three or five or more. Further, this clustering is performed by using the k-means clustering. In the k-means clustering, as a first step, in a vector space of the same dimension as feature vectors which are feature values extracted from the first scanned data, desired four points, which are randomly determined, are set as respective cluster points representative of the four clusters. As a second step, Euclidean distances from each feature vector point of the first scanned data to the four cluster points are calculated. Then, feature vector points of the first scanned data are each caused to belong to a cluster represented by one of the four cluster points, to which the Euclidean distance from each feature vector point is the shortest, i.e. which is closest to the feature vector point. As a third step, each cluster point is moved to the centroid of the feature vector points of the first scanned data belonging to the cluster represented by the cluster point. The second step and the third step are executed until the cluster points converge. Further, when another first document is scanned and input, the second step and the third step are similarly executed. Note that although the clustering in the clustering unit 302 is performed by using the k-means clustering in the present embodiment, this is not limitative, but for example, the clustering can be performed by using mixture Gaussian distribution or spectral clustering or the like.

As shown in FIG. 3A, the first cluster 311, the second cluster 312, the third cluster 313, and the fourth cluster 314 are set as the four clusters. Three items of the first document (first scanned data) are classified in the first cluster 311. One item of the first document is classified in the second cluster 312. Two items of the first document are classified in the third cluster 313. Three items of the first document are classified in the fourth cluster 314. Note that classification of the first document into each cluster is determined by the above-described clustering (clustering unit 302). Further, on the console section 112, the user can execute a plurality of types of operations for the first document scanned by the document scanner unit 300. The operation contents performed on the console section 112 include execution of the copy function, execution of the scan function, execution of the fax transmission function, and execution of the email transmission function in the present embodiment. After clustering has been performed by the clustering unit 302, the document recommended menu-setting unit (associating unit) 304 associates the operation contents executed by the user A for the first document on the console section 112, with the clusters into which the first scanned data has been classified. Execution of the copy function is associated as an operation content with the first cluster 311. Execution of the scan function, i.e. generation of Portable Document Format (PDF) data is associated as an operation content with the second cluster 312. Execution of the fax transmission function is associated as an operation content with the third cluster 313. Execution of the email transmission function is associated as an operation content with the fourth cluster 314. Note that although the operation content performed for the first document includes execution of the copy function, execution of the scan function, execution of the fax transmission function, and execution of the email transmission function in the present embodiment, this is not limitative. As the operation contents performed for the first document, at least one of execution of the copy function, execution of the scan function, execution of the fax transmission function, and execution of the email transmission function can be included.

As shown in FIG. 3B, similar to FIG. 3A, first, when the user B operates the image forming apparatus 150, the first document is scanned by the document scanner unit 300. Then, the clustering unit 302 performs clustering for classifying the first scanned data into one cluster of a first cluster 321, a second cluster 322, a third cluster 323, and a fourth cluster 324, set for the user B. Note that although the number of clusters set for the user B is four in the present embodiment, this is not limitative, but for example, the number of clusters can be set e.g. to any of one to three or five or more. One item of the first document is classified in the first cluster 321. Three items of the first document are classified in the second cluster 322. Two items of the first document are classified in the third cluster 323. Three items of the first document are classified in the fourth cluster 324. After clustering has been performed by the clustering unit 302, the document recommended menu-setting unit 304 associates the operation contents executed by the user B for the first document on the console section 112 with the clusters into which the first scanned data has been classified. Execution of the copy function is associated as the operation content with the first cluster 321. Execution of the scan function, i.e. generation of PDF data is associated as respective operation contents with the second cluster 322 and the third cluster 323. Note that although the operation contents for the second cluster 322 and the third cluster 323 are PDF data generation, the second cluster 322 and the third cluster 323 are different in the storage destination of the PDF data from each other. Execution of the email transmission function is associated as the operation content with the fourth cluster 324.

Figure 4:
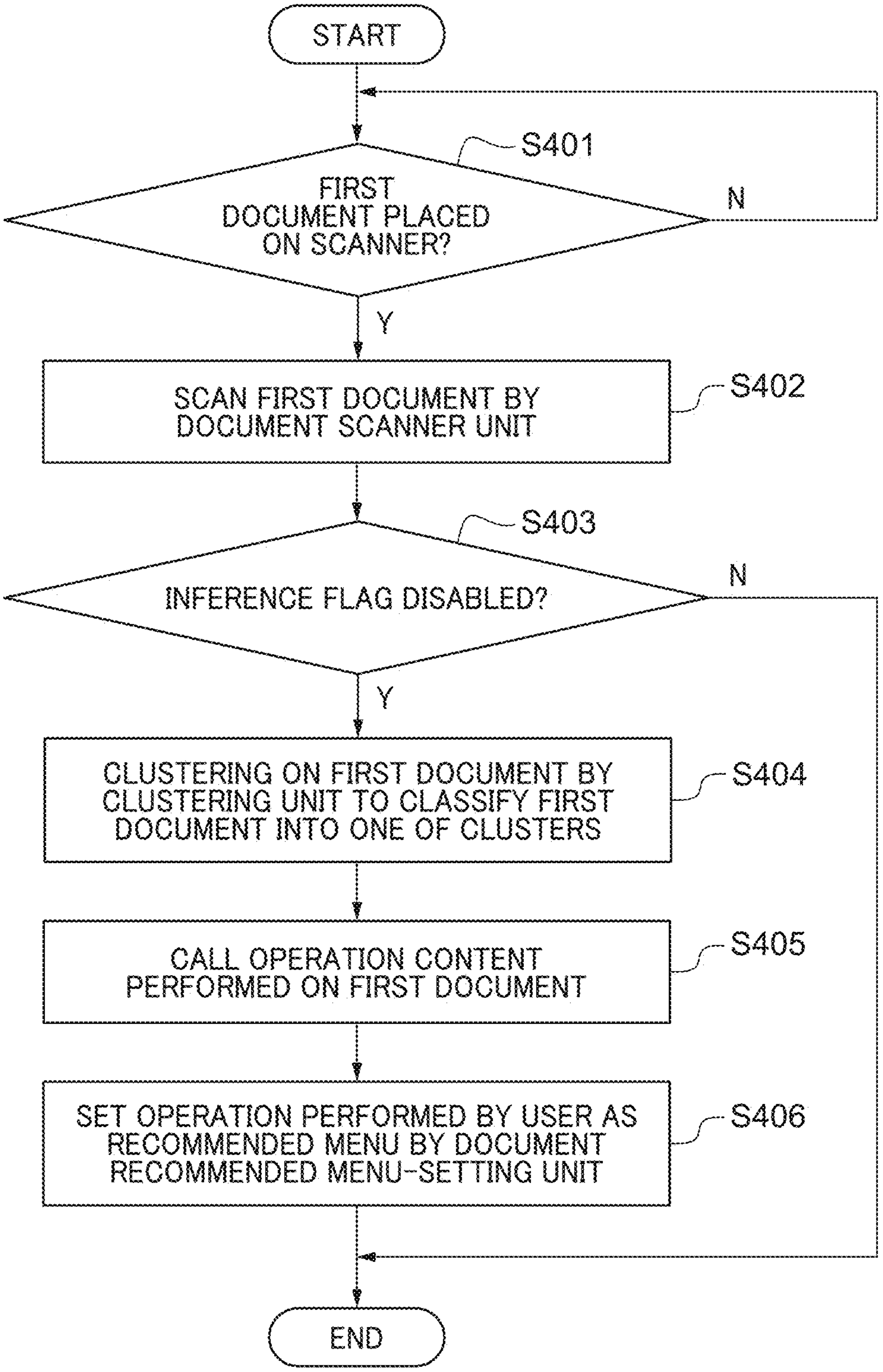
FIG. 4 is a flowchart of a process performed by the image forming apparatus in a learning mode.

FIG. 4 is a flowchart of a process performed by the image forming apparatus in the learning mode. As shown in FIG. 4, in a step S401, the CPU 101 determines whether or not a first document has been placed on the scanner 170. If it is determined in the step S401 that the first document has been placed, the process proceeds to a step S402. On the other hand, if it is determined in the step S401 that the first document has not been placed, the process remains in the step S401.

In the step S402, according to an operation of a scan start button (not shown) on the console section 112, the CPU 101 controls the document scanner unit 300 to thereby scan the first document placed on the scanner 170 in the step S401. With this, the first scanned data is acquired. Further, after the scan start button has been operated, one function of execution of the copy function, execution of the scan function, execution of the fax transmission function, and execution of the email transmission function is executed. Then, execution of the one function is stored e.g. in the storage 104 as an operation content performed for the first document. Further, in the step S402, the CPU 101 can identify an operator who has operated the scan start button, based on a result of the authentication performed by the authentication section 121. After execution of the step S402, the process proceeds to a step S403.

In the step S403, the CPU 101 determines, based on a result of the operation performed on the switching image 1000 (see FIG. 1B), whether or not the inference flag is disabled, i.e. the image forming apparatus 150 is in the learning mode. If it is determined in the step S403 that the inference flag is disabled, the process proceeds to a step S404. On the other hand, if it is determined in the step S403 that the inference flag is not disabled, the process is terminated.

In the step S404, the CPU 101 controls the clustering unit 302 to thereby perform the above-described clustering for the first scanned data acquired in the step S402. With this, the first scanned data (first document) is classified into one of the clusters. After execution of the step S404, the process proceeds to a step S405.

In the step S405, the CPU 101 calls the operation content performed for the first document, which is stored in the step S401.

In a step S406, the CPU 101 controls the document recommended menu-setting unit 304 to thereby associate the operation content performed on the first document and called in the step S405, with the cluster into which the first scanned data has been classified. With this, the operation content performed on the first document is set as the recommended menu.

With the above-described learning mode, a learned model used for inference is obtained. Note that although the first document is used in the learning mode, a second document different from the first document is used in the inference mode. Note that, for each user, the first document and the second document are different documents but the contents of the first document and the contents of the second document can be the same (including similar contents) or different from each other. The learned model includes e.g. a neural network and is set on an operator (user)-by-operator (user) basis. Neural network computation is performed by the GPU 109. Further, although deep learning is preferable as the machine learning algorithm, the support vector machine, the logistic regression, or the decision tree can be used. Note that in the flowchart in FIG. 4, processing for determining whether or not the time is up can be arranged between the step S401 and the step S402. In this case, for example, only in a case where the step S402 is executed within 60 seconds after the first document has been placed in the step S401, the process proceeds to the next step.

Figure 5A:
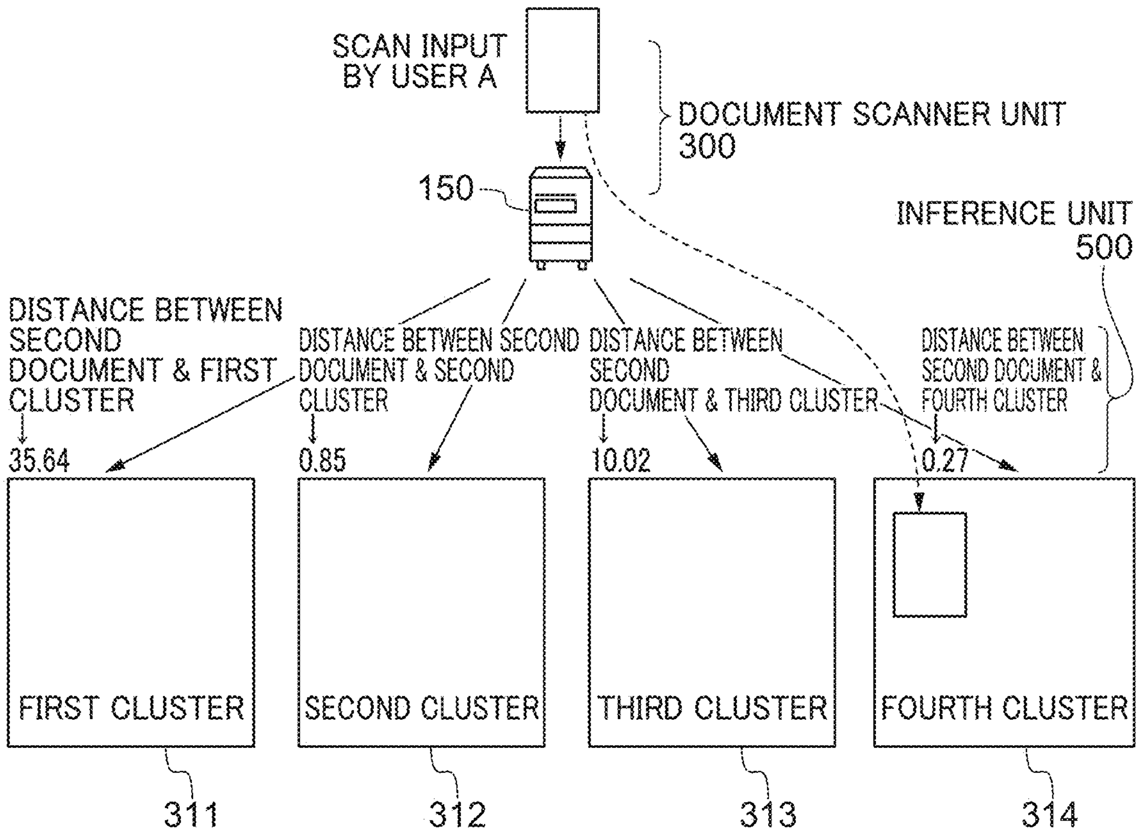
FIGS. 5A and 5B are diagrams useful in explaining an inference unit.
Figure 5B:
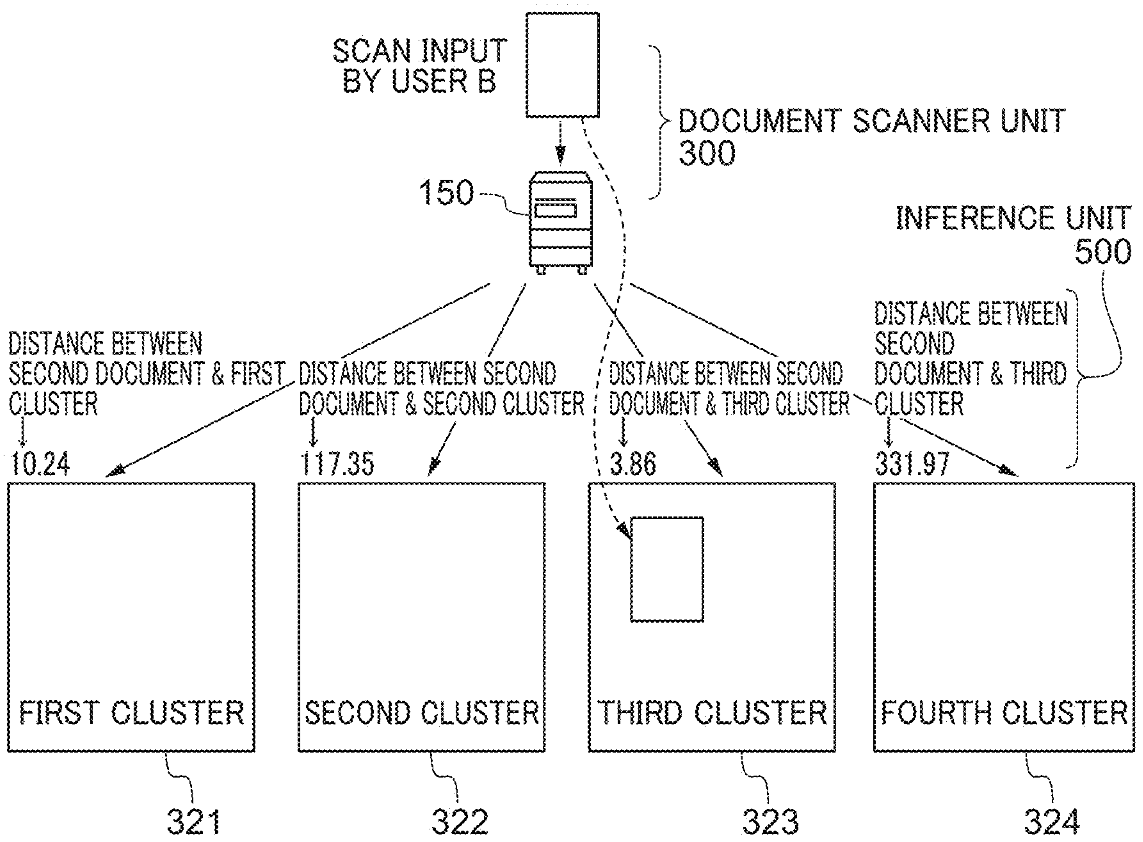

FIGS. 5A and 5B are diagrams useful in explaining the inference unit. FIG. 5A shows the operation of the inference unit 500, which is performed when the user A operates the image forming apparatus 150 in the inference mode (inference phase) to scan a second document (scan input by the user A). FIG. 5B shows the operation of the inference unit 500, which is performed when the user B operates the image forming apparatus 150 in the inference mode (inference phase) to scan a second document (scan input by the user B). Note that the second scanned data obtained by scanning the second document is a target of inference performed by the learned model, for inferring a cluster into which the second scanned data is to be classified. Further, which of the user A and the user B has scanned the second document is identified based on who has held the authentication card over the authentication section 121 before scanning the second document.

Referring to FIG. 5A, first, when the user A operates the image forming apparatus 150, the second document is scanned by the document scanner unit 300. With this, the second scanned data of the second document is acquired. Then, the inference unit 500 infers one cluster of the first cluster 311 to the fourth cluster 314, into which the second scanned data is to be classified, by using the learned model set for the user A. In this inference, as a first step, in a vector space of the same dimension as feature vectors which are feature values extracted from the second scanned data, Euclidean distances from feature vector points of the second scanned data to four cluster points are calculated. In the illustrated example in FIG. 5A, the average of Euclidean distances between the feature vector points within the first cluster 311 of the second scanned data and the centroid of the first cluster 311 (distance between the second document and the first cluster) is 35.64. The average of Euclidean distances between the feature vector points within the second cluster 312 of the second scanned data and the centroid of the second cluster 3121 (distance between the second document and the second cluster) is 0.85. The average of Euclidean distances between the feature vector points within the third cluster 313 of the second scanned data and the centroid of the third cluster 3131 (distance between the second document and the third cluster) is 10.02. The average of Euclidean distance between the feature vector points within the fourth cluster 314 of the second scanned data and the centroid of the fourth cluster 3141 (distance between the second document and the fourth cluster) is 0.27. As a second step, the second scanned data is classified into a cluster in which Euclidean distance between feature vector points within the cluster and the centroid of the cluster is the shortest. The second scanned data (second document) in the illustrated example is classified into the fourth cluster 314. Note that in determining a destination into which the second scanned data is classified, a threshold value can be set for the average of Euclidean distances. In this case, it is possible to determine a destination into which the second scanned data is classified, based on whether or not the calculated average of Euclidean distances is larger than the threshold value.

As shown in FIG. 5B, similar to FIG. 5A, first, when the user B operates the image forming apparatus 150, the second document is scanned by the document scanner unit 300. Then, the inference unit 500 infers one cluster of the first cluster 321 to the fourth cluster 324, into which the second scanned data is to be classified, by using the learned model set for the user B. In the illustrated example in FIG. 5B, the average value of Euclidean distances between the feature vector points within the first cluster 321 of the second scanned data and the centroid of the first cluster 321 (distance between the second document and the first cluster) is 10.24. The average value of Euclidean distances between the feature vector points within the second cluster 322 of the second scanned data and the centroid of the second cluster 322 (distance between the second document and the second cluster) is 117.35. The average value of Euclidean distances between the feature vector points within the third cluster 323 of the second scanned data and the centroid of the third cluster 323 (distance between the second document and the third cluster) is 3.86. The average value of Euclidean distances between the feature vector points within the fourth cluster 324 of the second scanned data and the centroid of the fourth cluster 324 (distance between the second document and the fourth cluster) is 331.97. The second scanned data (second document) in this case classified into the third cluster 323.

Figure 6A:
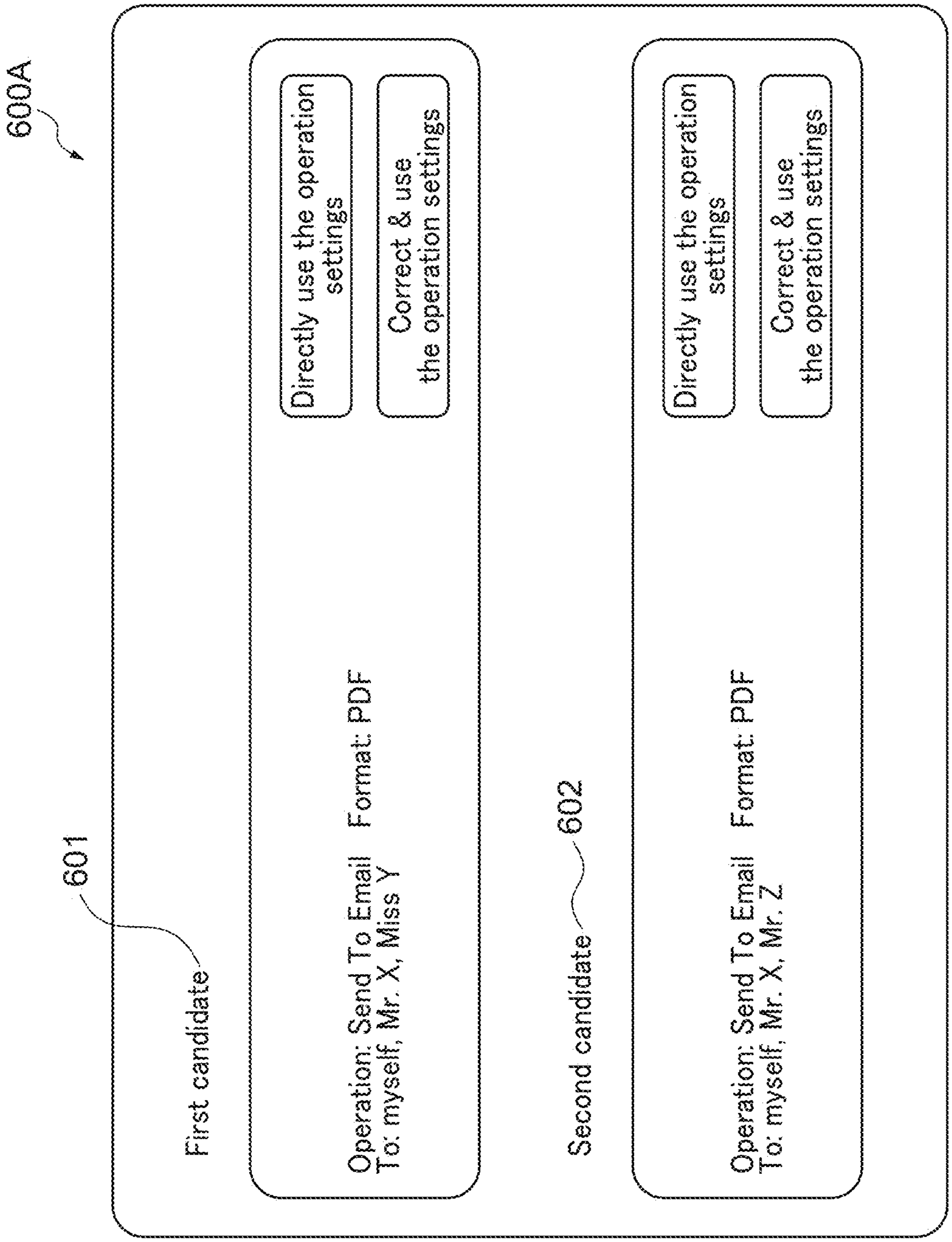
FIGS. 6A and 6B are diagrams useful in explaining a recommended menu display unit.
Figure 6B:
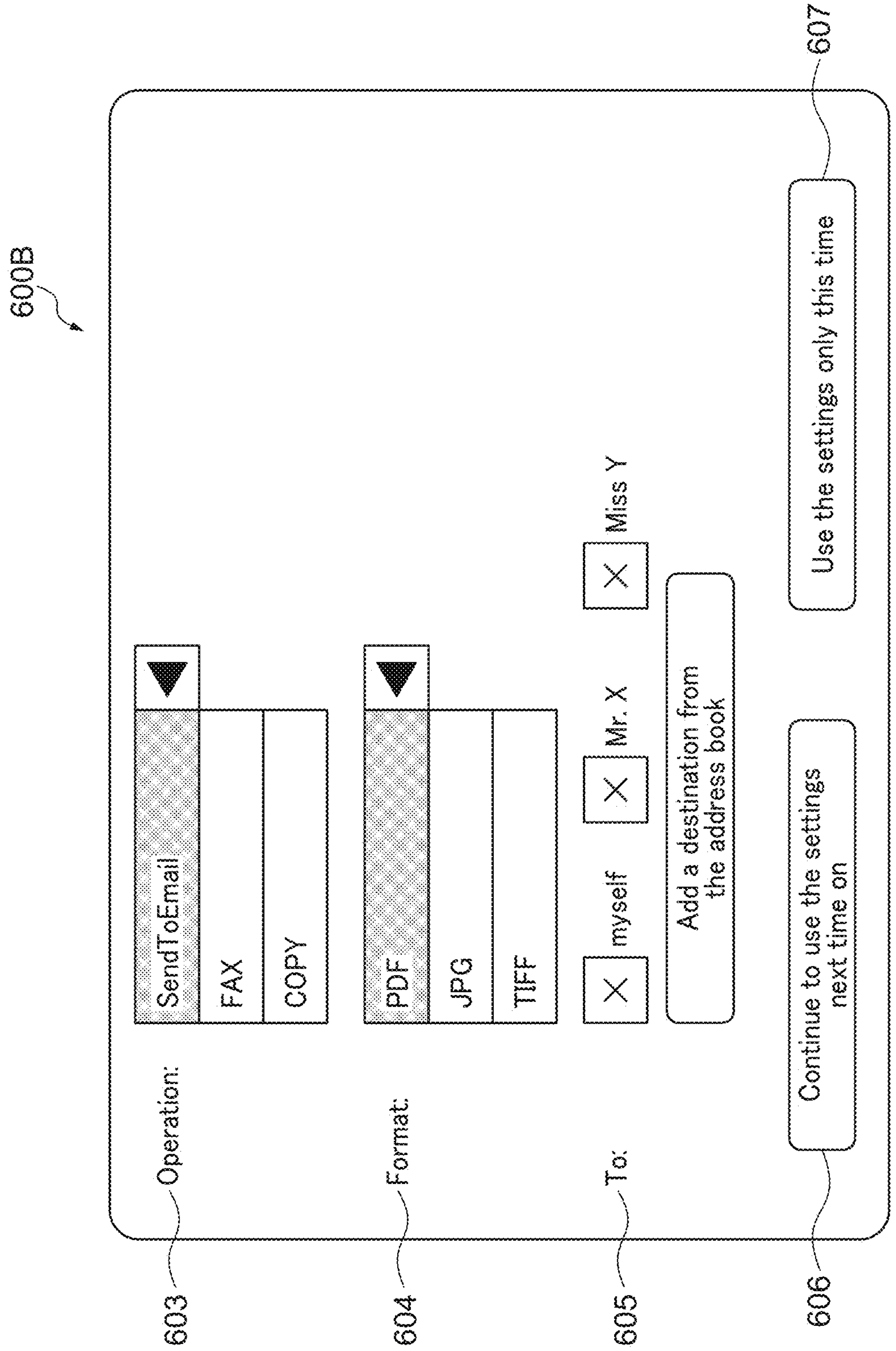

FIGS. 6A and 6B are diagrams useful in explaining a recommended menu display unit. The CPU 101 functions as the recommended menu display unit, denoted by reference numeral 600, that performs control to display, as a recommended menu, an operation content associated with a cluster into which the second scanned data is classified, as a result of inference performed by the inference unit 500. Note that the recommended menu is displayed on the console section 112. Further, the recommended menu display unit 600 is made available, on a user-by-user basis. Here, a case of the user A will be described as a representative.

FIG. 6A is a diagram showing an example of a screen displayed on the console section 112 in a case where it is inferred by the inference unit 500 that the second document input to the document scanner unit 300 by the user A is to be classified into the fourth cluster 314. As shown in FIG. 3A, a plurality of operation contents are associated with the fourth cluster 314. Specifically, duplicate two operation contents of "operation: ScanToEmail, format: PDF, destination: myself, X, and Y", and one operation content of "operation: ScanToEmail, format: PDF, destination: myself, X, and Z" are associated. In this case, the recommended menu display unit 600 can select at least one operation content from this plurality of operation contents and display the selected operation content on the console section 112. The screen shown in FIG. 6A, denoted by reference numeral 600A, includes a first candidate operation content 601 and a second candidate operation content 602. In the present embodiment, the recommended menu display unit 600 sets the first candidate operation content 601 to "operation: ScanToEmail, format: PDF, destination: myself, X, Y" in the descending order of the number of duplicate ones. Further, the recommended menu display unit 600 sets the second candidate operation content 602 to "operation: ScanToEmail, format: PDF, destination: myself, X, Z". Note that although the number of candidates is two in the present embodiment, this is not limitative, but for example, the number of candidates can be set to one or three or more.

FIG. 6B is a diagram showing an example of a screen displayed on the console section 112 when a user corrects the first candidate on the screen shown in FIG. 6A. The screen shown in FIG. 6B, denoted by reference numeral 600B, functions as a changing unit that changes operation contents. This screen 600B includes items of operation 603, format 604, and destination 605, a button 606, and a button 607. Note that the configuration of the screen 600B is not limited to this, but for example, any other item can be included. On the operation 603, it is possible to select and set one operation from “ScanToEmail”, “FAX”, and “COPY”. On the format 604, it is possible to select and set a file format from “PDF”, “JPG”, and “TIFF”. On the destination 605, it is possible to delete “myself”, “X”, and “Y” from the destinations and add a destination from an address book. When the button 606 is operated (pressed), for the document, it is possible to set the corrected settings in place of all the current settings of “the operation: ScanToEmail, the format: PDF, the destination: myself, X, and Y” associated with the fourth cluster 314. With this, it is possible to continuously display the changed operation contents after that. Specifically, in a case where the user A inputs the second document to the document scanner unit 300, and it is inferred by the inference unit 500 that the second document is to be classified into the fourth cluster 314 next time, the setting items corrected last time are displayed as the first candidate. Further, when the button 607 is operated, the changed operation contents are inhibited from being continuously displayed.

Figure 7:
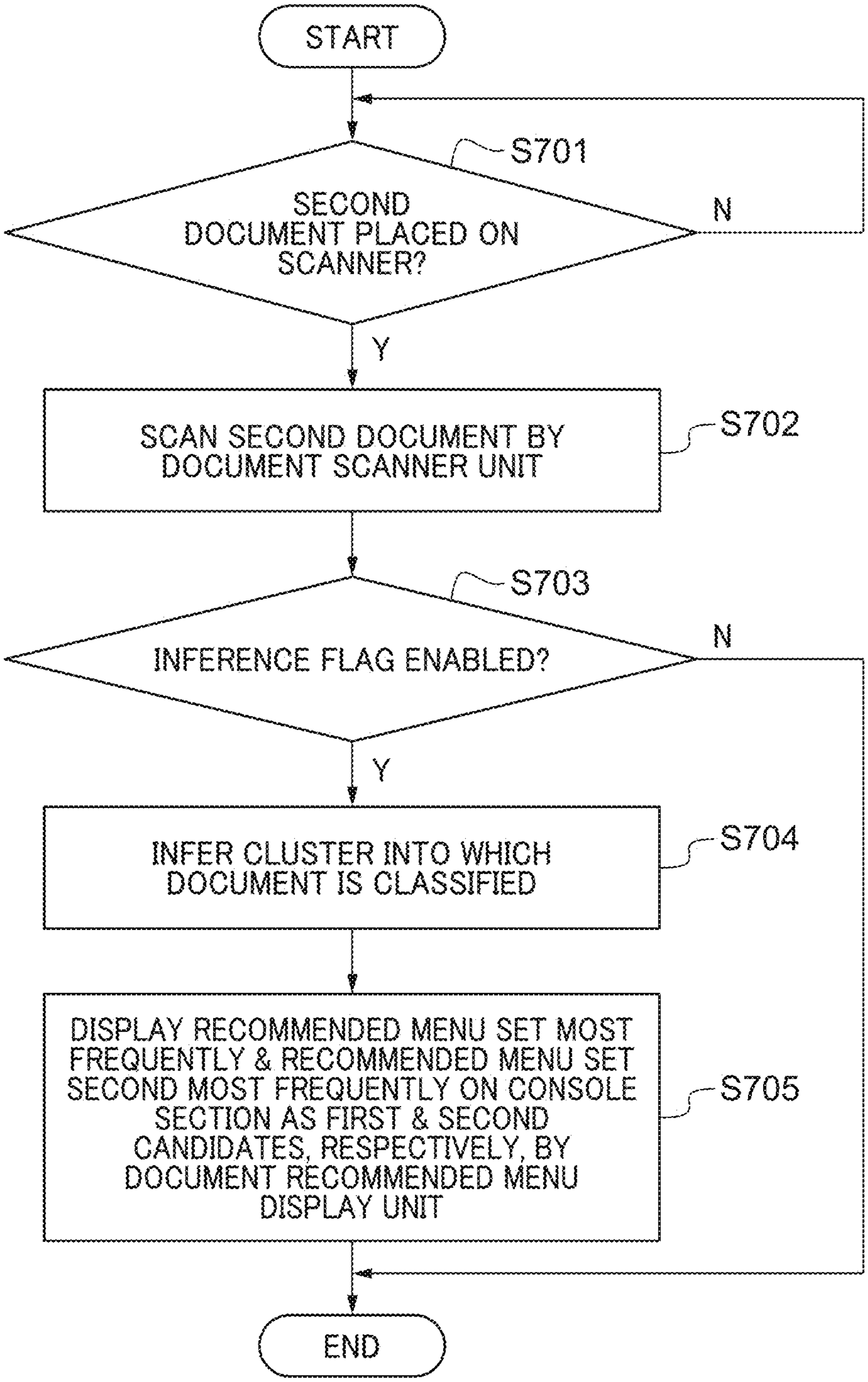
FIG. 7 is a flowchart of a process performed by the image forming apparatus in an inference mode.

FIG. 7 is a flowchart of a process performed by the image forming apparatus in the inference mode. As shown in FIG. 7, in a step S701, the CPU 101 determines whether or not a second document has been placed on the scanner 170. If it is determined in the step S701 that the second document has been placed, the process proceeds to a step S702. On the other hand, if it is determined in the step S701 that the second document has not been placed, the process remains in the step S701.

In the step S702, the CPU 101 controls the document scanner unit 300 to scan the second document placed on the scanner 170 in the step S701 according to an operation of the scan start button (not shown) on the console section 112. With this, the second scanned data is acquired. Further, in the step S702, the CPU 101 can identify an operator who has operated the scan start button based on a result of the authentication performed by the authentication section 121. After execution of the step S702, the process proceeds to a step S703.

In the step S703, the CPU 101 determines, based on a result of the operation on the switching image 1000 (see FIG. 1B), whether or not the inference flag is enabled, i.e. whether or not the image forming apparatus 150 is in the inference mode. If it is determined in the step S703 that the inference flag is enabled, the process proceeds to a step S704. The inference mode is executed after that. On the other hand, if it is determined in the step S703 that the inference flag is not enabled, the process is terminated. In this case, execution of the learning mode is enabled.

In the step S704, the CPU 101 controls the inference unit 500 to perform the above-described inference, i.e. infer to which cluster the second scanned data acquired in the step S702 is to be classified.

In a step S705, the CPU 101 controls the recommended menu display unit 600 to set a recommended menu which has been set most frequently for a cluster into which the second scanned data is to be classified, as the first candidate as described above, and sets a recommended menu which has been set second most frequently for a cluster into which the second scanned data is to be classified, as the second candidate. Then, the first and second candidates are displayed on the console section 112.

As described above, the image forming apparatus 150 is shared by a plurality of users (a user a and a user β in this example). In this case, even when the user a and the user β acquire the same scanned data, the user a sometimes transmits the scanned data by fax using the fax transmission function, but the user β sometimes transmits the scanned data by email using the email transmission function. Thus, an operation content which a user desires to operate is sometimes different on a user-by-user basis, and hence it can be difficult to quickly reach a desired operation screen. To solve this problem, in the image forming apparatus 150, it is possible to generate a learned model by performing learning on the first scanned data on a user-by-user basis. Further, it is possible to perform inference on the second scanned data according to the learned model generated on a user-by-user basis. With this, it is possible to display a screen for executing the fax transmission function for the user a, and display a screen for executing the email transmission function for the user B. Thus, the image forming apparatus 150 can quickly reach an operation screen on which a desired operation can be performed on a user-by-user basis, and therefore, the image forming apparatus 150 functions as an apparatus excellent in supporting a user (supporting an operation).

Figure 8:
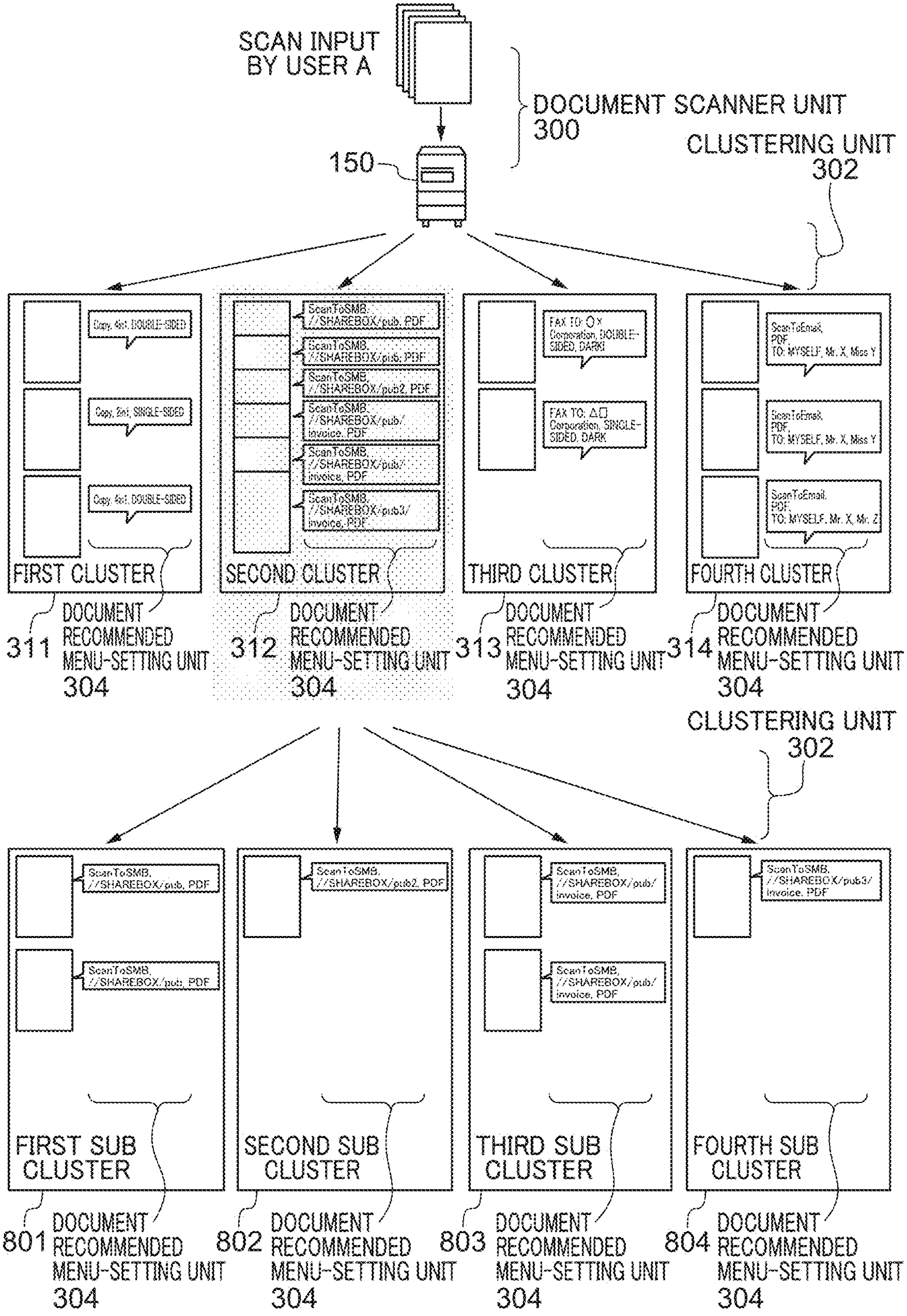
FIG. 8 is a diagram useful in explaining the document scanner unit, the clustering unit, and the document recommended menu-setting unit of the image forming apparatus according to a second embodiment.

A second embodiment will be described below with reference to FIG. 8, but the description is given mainly of different points from the above-described embodiment, and description of the same points is omitted. The present embodiment is the same as the first embodiment except that clustering is different. FIG. 8 is a diagram useful in explaining the document scanner unit 300, the clustering unit 302, and the document recommended menu-setting unit 304 of the image forming apparatus according to the second embodiment. For example, in a case where the number of recommended menus for one cluster is relatively increased, there is a fear that a recommended menu suitable for a user is not necessarily displayed on the console section 112. In the present embodiment, the total number of associated operation contents per one cluster is limited. In a case where the total number of associated operation contents per one cluster exceeds a threshold value, the clustering unit 302 performs clustering again. By performing this clustering again, it is possible to generate sub clusters, each having a small number of recommended menus. Then, in the inference mode, it is possible to increase the possibility of displaying a recommended menu suitable for a user by using the sub clusters.

Here, a case where the threshold value of the total number of associated operation contents per one cluster is set to 3 will be described by way of example. As shown in FIG. 8, assuming that the number of operation contents (recommended menus) associated with the second cluster 312 exceeds the threshold value (3) is four, clustering is performed again. As a result, a first sub cluster 801, a second sub cluster 802, a third sub cluster 803, and a fourth sub cluster 804 are generated. The first sub cluster 801 to the fourth sub cluster 804 each have one type of the operation content, the number of which is smaller than the threshold value. After that, in the inference mode, use of the operation contents associated with the second cluster 312 is inhibited, and in place of this, the operation contents associated with the first sub cluster 801 to the fourth sub cluster 804 can be used. With this, in the inference mode, it is possible to display the operation contents (recommended menus) suitable for the user. Note that the re-clustering method is not particularly limited, and for example, the k-means clustering can be used.

Figure 9:
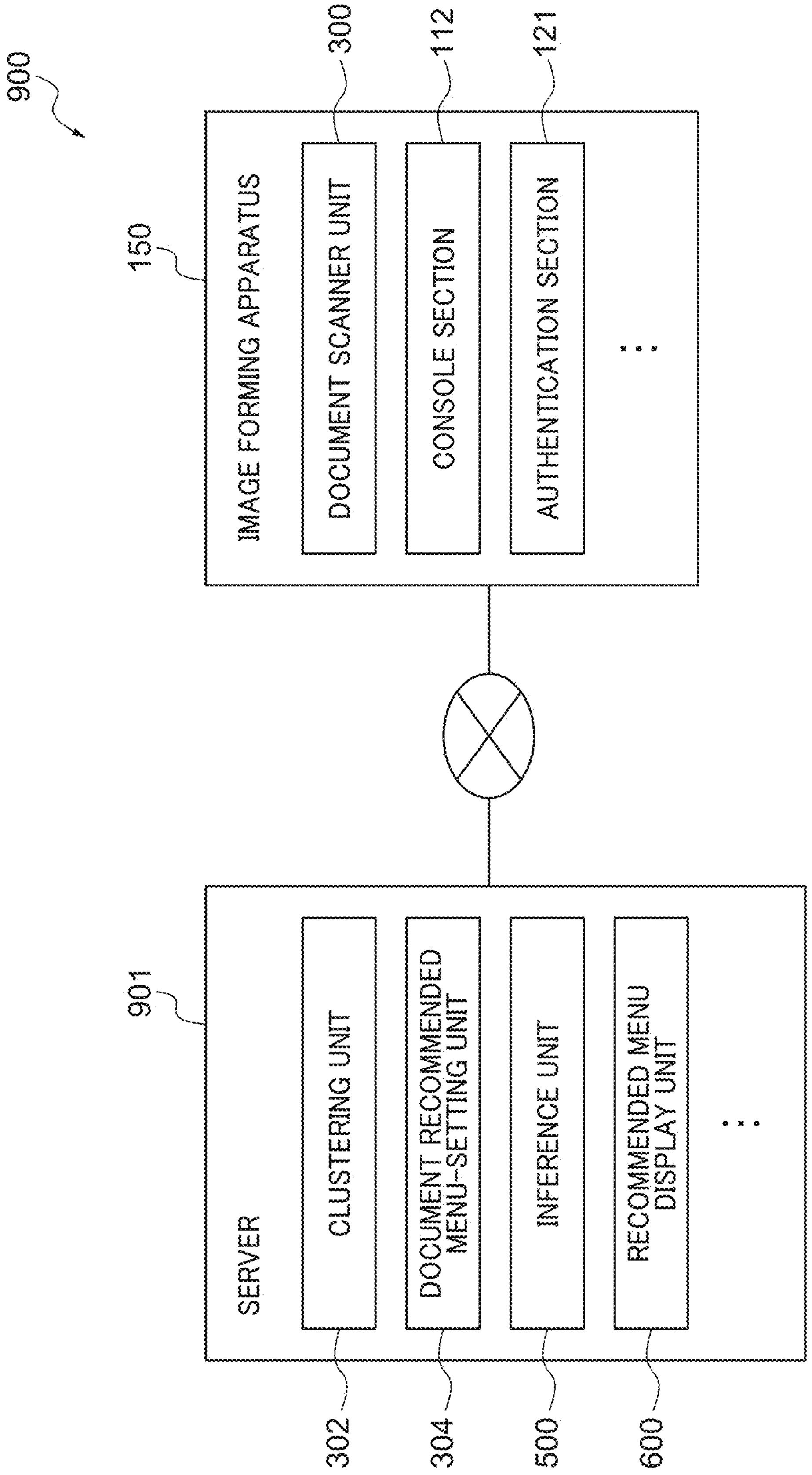
FIG. 9 is a block diagram showing the entire configuration of an image processing system according to a third embodiment.

A third embodiment will be described below with reference to FIG. 9, but the description is given mainly of different points from the above-described embodiments, and description of the same points is omitted. The present embodiment is the same as the first embodiment but differs from the first embodiment only in that the apparatus in which the clustering unit 302, the document recommended menu-setting unit 304, the inference unit 500, and the recommended menu display unit 600 are arranged is different. FIG. 9 is a block diagram showing the entire configuration of an image processing system according to the third embodiment.

As shown in FIG. 9, the image processing system, denoted by reference numeral 900, includes the image forming apparatus 150 and a server 901 communicably connected to the image forming apparatus 150. The image forming apparatus 150 includes the document scanner unit 300, the console section 112, the authentication section 121, and so forth. In the present embodiment, the clustering unit 302, the document recommended menu-setting unit 304, the inference unit 500, and the recommended menu display unit 600 are arranged in the server 901. That is, the server 901 has the clustering unit 302, the document recommended menu-setting unit 304, the inference unit 500, and the recommended menu display unit 600. With this, for example, the configuration of the image forming apparatus 150 can be simplified. Further, one server 901 can be shared by a plurality of image forming apparatuses 150. Note that the program for causing a computer to execute methods of controlling the components and the units of the image forming apparatus 150 and the server 901 can be stored in the image forming apparatus 150 or can be stored in the server 901. Further, the programs can be distributed and stored in the image forming apparatus 150 and the server 901. Further, the server 901 can be provided within Japan or can be provided outside Japan.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-113587 filed Jul. 11, 2023, which is hereby incorporated by reference herein in its entirety.

What is claimed is:

1. An image processing apparatus comprising:

a scanner unit configured to be capable of acquiring, by scanning a first document, first scanned data of the first document and acquiring, by scanning a second document different from the first document, second scanned data of the second document;

an operation unit configured to be capable of executing a predetermined operation on the first document scanned by the scanner unit;

an identification unit configured to identify a plurality of users who operate the operation unit, on a user-by-user basis;

a clustering unit configured to perform clustering for classifying the first scanned data into one cluster of a plurality of clusters set for each user, according to contents of the first document;

an associating unit configured to associate an operation content executed by the operation unit on the first document for each user with the cluster into which the first scanned data has been classified;

an inference unit configured to infer one cluster of the plurality of clusters, into which the second scanned data is to be classified; and a control unit configured to perform control to display an operation content associated with a cluster into which the second scanned data is inferred to be classified by the inference unit.

2. The image processing apparatus according to claim 1, wherein the image processing apparatus has a copy function, a scan function, a fax transmission function, and an email transmission function, and wherein at least one of execution of the copy function, execution of the scan function, execution of the fax transmission function, and execution of the email transmission function is included in each operation content.

3. The image processing apparatus according to claim 1, wherein the clustering unit extracts feature values from the first scanned data and performs the clustering based on the extracted feature values.

4. The image processing apparatus according to claim 1, wherein the clustering unit performs the clustering by using one of k-means clustering, mixture Gaussian distribution, and spectral clustering.

5. The image processing apparatus according to claim 1, wherein in a case where an upper limit of the total number of operation contents to be associated with each cluster by the associating unit is exceeded, the clustering unit performs the clustering again.

6. The image processing apparatus according to claim 1, wherein the associating unit can associate a plurality of operation contents with each cluster set on a user-by-user basis.

7. The image processing apparatus according to claim 6, wherein the control unit selects and displays at least one of the plurality of operation contents.

8. The image processing apparatus according to claim 6, wherein the control unit displays an operation content as a first candidate and an operation content as a second candidate from among the plurality of operation contents.

9. The image processing apparatus according to claim 8, wherein duplicate operation contents are included in the plurality of operation contents, and wherein the control unit sets the first candidate and the second candidate in a descending order of the number of duplicate operation contents.

10. The image processing apparatus according to claim 1, further comprising a changing unit configured to change the operation content displayed by the control unit.

11. The image processing apparatus according to claim 10, wherein the control unit continuously displays the operation content changed by the changing unit.

12. The image processing apparatus according to claim 1, wherein the operation unit is configured such that the operation content can be displayed by the control unit.

13. An image processing system that includes an image processing apparatus that is capable of performing image processing, and a server that is communicably connected to the image processing apparatus, and wherein the image processing apparatus comprises:

a scanner unit configured to be capable of acquiring, by scanning a first document, first scanned data of the first document and acquiring, by scanning a second document different from the first document, second scanned data of the second document;

an operation unit configured to be capable of executing a predetermined operation on the first document scanned by the scanner unit; and an identification unit configured to identify a plurality of users who operate the operation unit, on a user-by-user basis, and wherein the server comprises:

a clustering unit configured to perform clustering for classifying the first scanned data into one cluster of a plurality of clusters set for each user, according to contents of the first document;

an associating unit configured to associate an operation content executed by the operation unit on the first document for each user with the cluster into which the first scanned data has been classified;

an inference unit configured to infer one cluster of the plurality of clusters, into which the second scanned data is to be classified; and a control unit configured to perform control to display an operation content associated with a cluster into which the second scanned data is inferred to be classified by the inference unit.

14. A method of controlling an image processing apparatus that is capable of performing image processing, comprising:

acquiring, by scanning a first document, first scanned data of the first document;

acquiring, by scanning a second document different from the first document, second scanned data of the second document;

executing a predetermined operation on the first document scanned by the scanning;

identifying a plurality of users who execute the operation, on a user-by-user basis;

performing clustering for classifying the first scanned data into one cluster of a plurality of clusters set for each user, according to contents of the first document;

associating an operation content executed on the first document for each user with the cluster into which the first scanned data has been classified;

inferring one cluster of the plurality of clusters, into which the second scanned data is to be classified; and performing control to display an operation content associated with a cluster into which the second scanned data is inferred to be classified by said inferring.

15. A non-transitory computer-readable storage medium storing a program for causing a computer to execute a method of controlling an image processing apparatus that is capable of performing image processing, wherein the method comprises:

acquiring, by scanning a first document, first scanned data of the first document;

acquiring, by scanning a second document different from the first document, second scanned data of the second document;

executing a predetermined operation on the first document scanned by the scanning;

identifying a plurality of users who execute the operation, on a user-by-user basis;

performing clustering for classifying the first scanned data into one cluster of a plurality of clusters set for each user, according to contents of the first document;

associating an operation content executed on the first document for each user with the cluster into which the first scanned data has been classified;

inferring one cluster of the plurality of clusters, into which the second scanned data is to be classified; and performing control to display an operation content associated with a cluster into which the second scanned data is inferred to be classified by said inferring.

* * * * *